T. M. FOOTE.
SPEED AND DISTANCE INDICATING AND RECORDING MECHANISM.
APPLICATION FILED MAY 13, 1905.

1,101,840.

Patented June 30, 1914.

WITNESSES
Horace A. Crossman
Everett S. Emery

INVENTOR
Theodore M. Foote
BY
Emery, Booth & Towle
ATTORNEYS.

T. M. FOOTE.
SPEED AND DISTANCE INDICATING AND RECORDING MECHANISM.
APPLICATION FILED MAY 13, 1905.

1,101,840.

Patented June 30, 1914.

WITNESSES:

INVENTOR
Theodore M. Foote.
BY
ATTORNEYS.

T. M. FOOTE.
SPEED AND DISTANCE INDICATING AND RECORDING MECHANISM.
APPLICATION FILED MAY 13, 1905.

1,101,840.

Patented June 30, 1914.

WITNESSES:

INVENTOR
Theodore M. Foote.
BY
ATTORNEYS.

T. M. FOOTE.
SPEED AND DISTANCE INDICATING AND RECORDING MECHANISM.
APPLICATION FILED MAY 13, 1905.

1,101,840.

Patented June 30, 1914.

WITNESSES:
Horace H. Crossman
Everett S. Emery

INVENTOR
Theodore M. Foote.
BY
Emery, Booth + Varle
ATTORNEYS.

UNITED STATES PATENT OFFICE.

THEODORE M. FOOTE, OF BROOKLYN, NEW YORK, ASSIGNOR TO PETER B. BRADLEY, OF HINGHAM, MASSACHUSETTS.

SPEED AND DISTANCE INDICATING AND RECORDING MECHANISM.

1,101,840.         Specification of Letters Patent.      Patented June 30, 1914.

Application filed May 13, 1905. Serial No. 260,286.

*To all whom it may concern:*

Be it known that I, THEODORE M. FOOTE, a citizen of the United States, residing at Brooklyn, county of Kings, State of New York, have invented an Improvement in Speed and Distance Indicating and Recording Mechanism, of which the following description, in connection with the accompanying drawings, is a specification, like letters on the drawings representing like parts.

My invention relates to apparatus for indicating and recording the speed of and distance traveled by a moving device, but more particularly for indicating the speed of, and distance traveled by a motor vehicle.

The objects of my invention are first to provide a simple and compact form of audible and visual speed indicating means; second, to provide simple and accurate means for producing a continuous permanent record of the speed and time of travel of, and distance traveled by, the vehicle. Furthermore, in operating a motor vehicle it is frequently desirable to ascertain the total distance which has been covered by the vehicle, or the distance between two given points, or to enable the owner of the vehicle to detect unauthorized use thereof by the chauffeur or other person.

A further object of my invention therefore is to provide means for furnishing a series of successive records or tickets showing the distance traveled by the vehicle in corresponding successive intervals of time, such that the comparison of one with the next successive record obtained from the apparatus will indicate the distance traveled by the vehicle in the interval between the taking of the records, and furthermore, a comparison of any given record of the series with a subsequent record, will show whether the vehicle has been operated in the interval between the taking of such records.

My invention will be best understood from a description of one particular embodiment thereof, which has been herein selected for the purposes of illustration and is shown in the accompanying drawings, and its scope will be pointed out in the appended claims.

In the drawings, Fig. 18 is a view in elevation of a portion of a motor vehicle showing my apparatus mounted thereon; Fig. 19 is a plan view upon a reduced scale of the apparatus, showing the manner of connecting the actuating and visual indicator operating shafts thereto; Fig. 20 is a vertical sectional view of a visual speed indicator or semaphore to enable by-standers to ascertain the speed of the vehicle, or other device to which the apparatus is attached; Fig. 21 is a horizontal sectional view of the same; and, Fig. 22 is a face view of the indicator disk or semaphore to be used in connection with the visual speed indicator.

Figure 1:
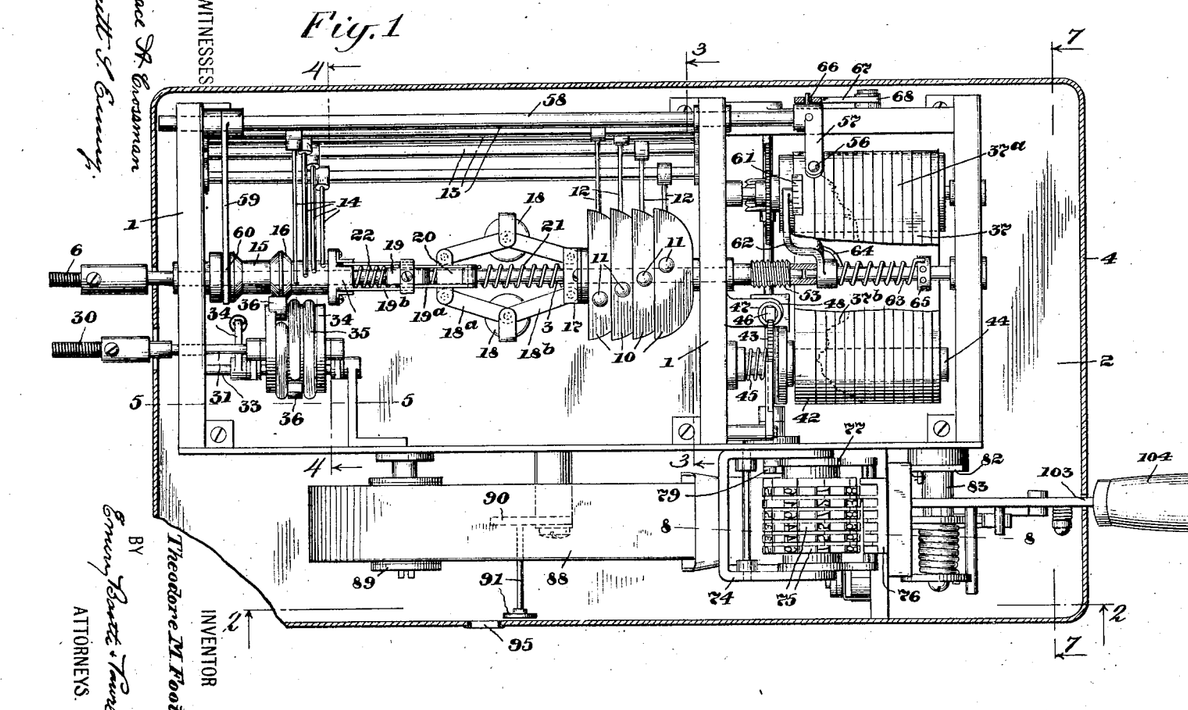
—Figure 1 is a plan view of the mechanism, the inclosing casing thereof being shown in section.
Figure 7:
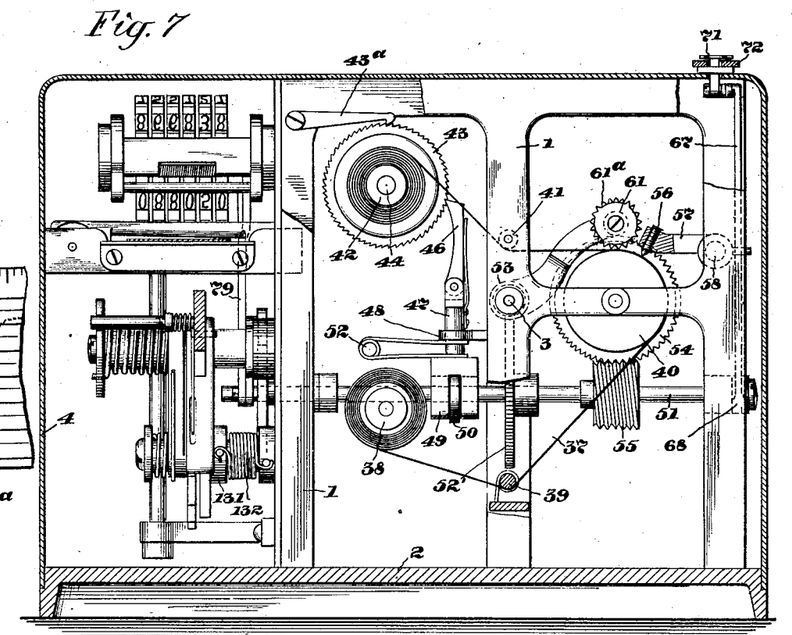
Fig. 7 is a vertical sectional view upon the line 7—7 Fig. 1.
Figures 8, 13, 14, 15, 16, 17:
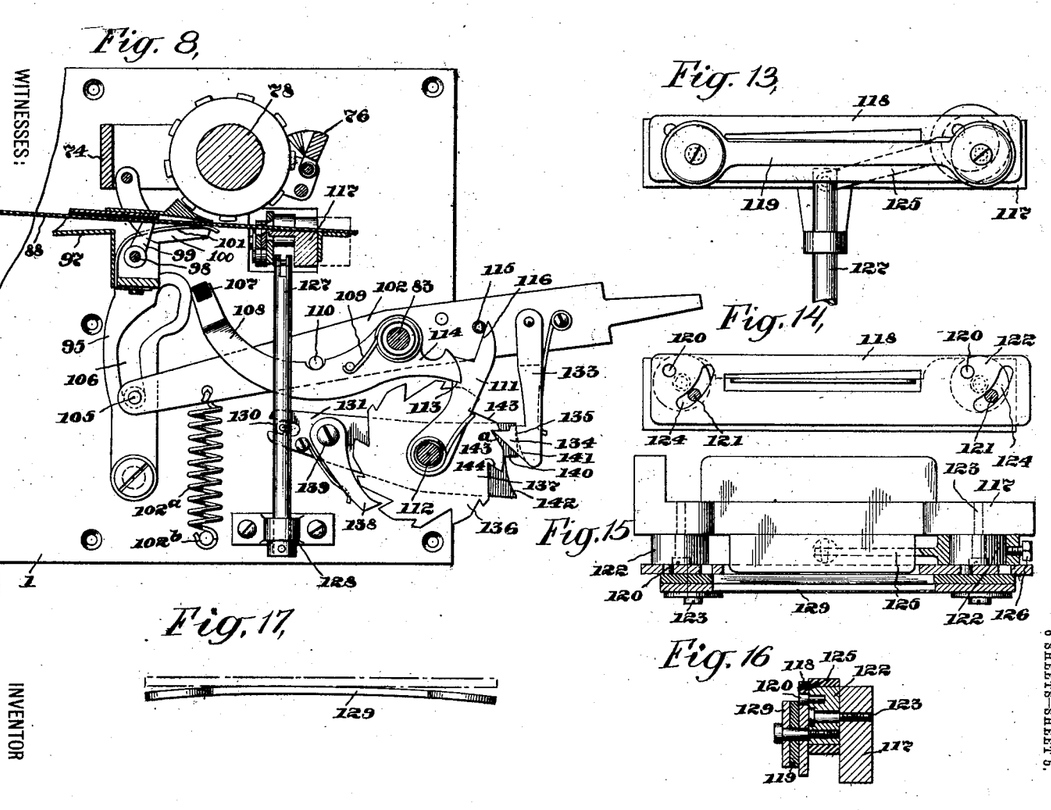
Fig. 8 is a detail view partly in section on the line 8—8, Fig. 1.
Fig. 13 is a view in front elevation of severing mechanism for severing successive distance records from a continuous strip.
Figs. 14, 15 and 16 are detail views, partly in section, of said severing mechanism.
Fig. 17 is a detail of a spring blade holder to be used in conjunction with the cutting or severing mechanism.
Figures 18, 19, 20, 21, 22:
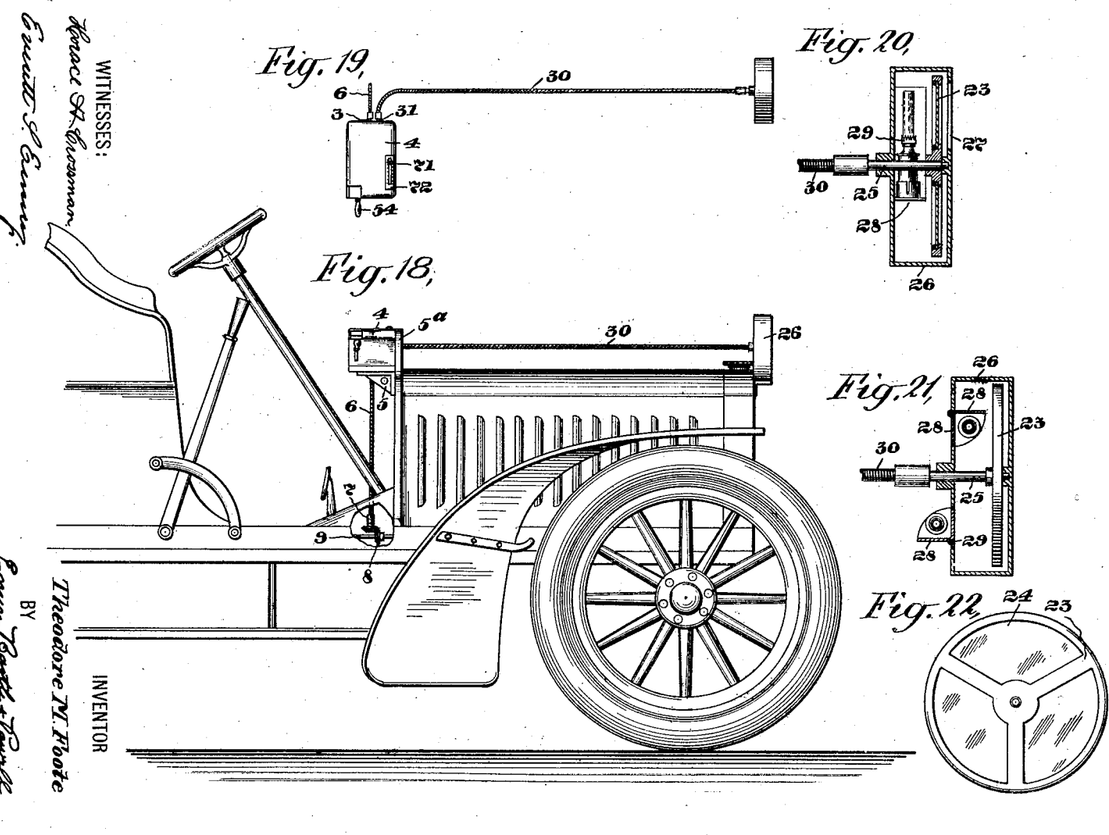

In the particular embodiment of my invention which has herein been selected for illustration, the apparatus comprises a main frame 1, mounted upon a suitable base plate 2, and having journaled therein a main operating shaft 3. The mechanism may be inclosed in a dustproof protecting cover or casing 4, and as shown in Figs. 7 and 8, when used for recording speed of and distance traveled by a motor vehicle, as shown, may be mounted within convenient range of observation of the chauffeur, as, for instance, see Fig. 18, upon a suitable bracket 5, attached to the engine hood 5ª. To one extremity of the main operating shaft 3, as shown in Figs. 1 and 19, which projects from the casing 4, is connected an intermediate flexible shaft 6, provided at its opposite extremity with a gear 7, Fig. 18, driven by a gear 8, secured upon a shaft 9, which latter is operatively connected with any suitable portion of the running gear of the vehicle, whose speed at all times corresponds exactly with the rate of travel of the vehicle.

Figures 3, 6:
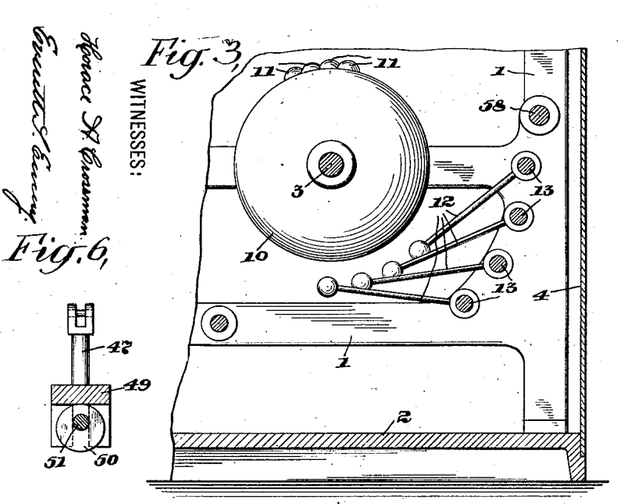
Fig. 3 is a broken sectional view on the line 3—3, Fig. 1.
Fig. 6 is a detail of a ratchet pawl actuating member hereinafter described.
Figure 4:
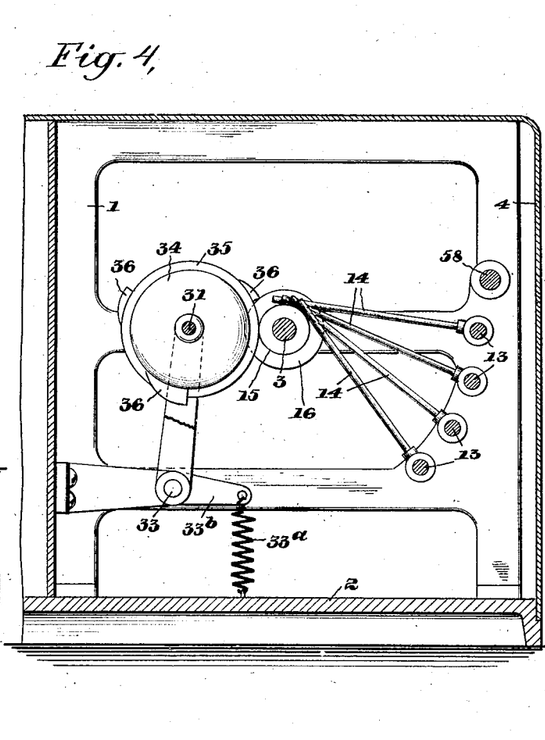
Fig. 4 is a vertical sectional view upon the line 4—4 Fig. 1.

The audible speed indicating mechanism here shown comprises a plurality of bells or chimes 10 (Figs. 1, 3 and 4) which are of different tones, the tone of each corresponding to a certain predetermined speed of the vehicle. To sound the bells 10, each has secured to its perimeter a stud or projection 11, which, as the bell rotates with the shaft 3, is adapted to strike against the bell hammers 12, of the respective bells 10, when said hammers are moved into the path of said studs. To this end the hammers 12 are fixed to suitable rockshafts 13 (Figs. 1, 3 and 4) journaled in the main frame 1, and each rockshaft is provided near one end with a rocking arm 14, which lies in contact with a governor controlled positioning sleeve 15 slidably mounted upon the main shaft 3, and having an annular beveled ridge 16, which, as the sleeve is moved longitudinally of the shaft 3, by suitable speed controlled mechanism, hereafter to be described, as the speed of the vehicle varies, rocks the arms 14, and consequently the bell sounders, respectively connected therewith successively, for different speeds of the vehicle. While movement of the actuating sleeve 15 along the shaft 3 may be effected by any suitable speed controlled mechanism, I have here shown a mechanism for this purpose which will respond accurately for a large range of variation in the speed, consisting of a plurality of centrifugal governors 18 and 19, mounted adjacent each other longitudinally of the shaft 3 and having adjacent links 18a and 19a, respectively, pivoted to block 20, slidably mounted upon said shaft, said governors respectively being also connected with a collar 17 fixed on the shaft, and the speed controlled sleeve 15 by links 18b and 19b, said governors respectively being normally held in contracted position by means of the springs 21 and 22.

I have found it of advantage so to construct the governors that they will expand successively in response to different rates of speed, the first in response to a range of speed from zero to a certain given rate, the second being at this time held in contracted position, and the second in response to a range of speed from said given predetermined rate to a given higher rate. Otherwise, if the governors both expand simultaneously, the extent of expansion for each will be so small for a given amplitude of movement of the sleeve 15, that error in the operation of said governors due to lost motion and other causes will fall entirely within this small range of expansion, whereas when the governors operate successively, error incident to the operation of each governor will be distributed throughout the entire range of movement of said governor or from zero to its limit, whereby variations in speed will be more accurately indicated by the movements of the sleeve. To this end the spring 21 is made of a tension sufficient to yield to the centrifugal action of the speed governor 18 connecting the stationary block 17 with the sliding block 20, up to a given predetermined speed of the apparatus, whereby the governor 19 and the sleeve 15 will be moved to a point where the former will have room for expansion, while the spring 22 is made of a greater tension, to resist expansive action of the governor 19 extending between the block 20 and the sleeve 15 up to this predetermined point, so that up to such point of speed, the governor 19 will remain in contracted position, and the sleeve 15 will be moved longitudinally of the shaft 3 solely by the centrifugal action of the governor 18. When, however, the speed exceeds said predetermined point, the centrifugal action of the governor 19 will overcome the resistance of the spring 22 and will then expand and tend to draw the sleeve 15 and the block 20 together. Inasmuch, however, as the block 20 is held against such movement by the centrifugal action of the governor 18, the force of the governor 19 will necessarily be expended along the line of least resistance and will move only the sleeve 15 and then further draw it to the right. By the construction just described I am enabled to secure a large amplitude of movement of the sleeve 15, with speed controlled mechanism having less divergence with respect to the main shaft and thereby requiring less space for operation than would be possible with a single pair of speed controlled weights of the kind shown and having links extending from the sleeve 15 to the collar 17; consequently, the apparatus as a whole is rendered more compact. The number of pairs of speed controlled weights may be increased indefinitely, limited only by the space available and the desired amplitude of movement of the speed controlled member.

To provide visual speed indicating means which may be automatically shifted to indicate different rates of speed, I have provided apparatus in the nature of a semaphore and consisting (Figs. 18, 20, 21 and 22) of a disk 23, having segments 24, of differently colored translucent material and mounted upon a shaft 25, journaled in suitable bearings in a casing 26, which may be secured at any point upon the vehicle, as upon the engine hood, for observation by a bystander. The front face of the casing 26 is provided (Fig. 20) with a segmental opening 27, corresponding in shape and size to the transparent colored segments of the disk 23 and through which the disk may be observed, while upon the rear face of the casing may be mounted upon suitable brackets 28, one or more lamps 29, positioned to illuminate the colored segments 24, when the latter are in alinement with the visual opening 27 in the front of the casing. For convenience of manipulation of the lamps the brackets 28 may be pivoted at 29 to the rear wall of the casing, in order that they may be readily swung into and out of the casing 26', and may be provided with shutter like vertical extensions which serve to close the lamp aperture when the bracket is turned within or without the casing.

Figure 5:
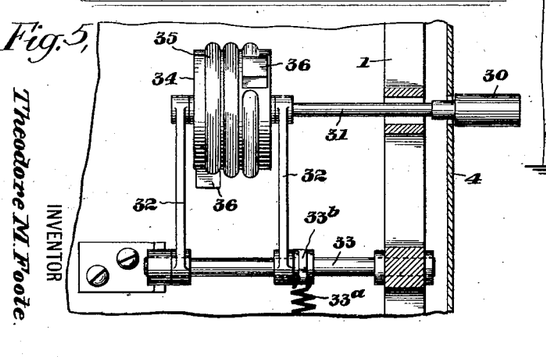
Fig. 5 is a broken sectional detail view on the line 5—5, Fig. 1.

To shift the different segments of the semaphore disk 23 successively opposite the visual opening 27 in the casing 26, the shaft 25 upon which the semaphore disk 23 is mounted, is connected by a suitable flexible shaft 30 (Figs. 18 and 19) with a short shaft 31 (Figs. 1, 4 and 5) journaled in the rocking arms 32, fixed upon a rocking stud 33, secured to the machine frame. The shaft 31 (Figs. 1, 4 and 5) has fixedly mounted thereon between the rocking arms 32 a semaphore operating friction wheel 34, which is provided with a plurality of annular friction surfaces 35, preferably strips of leather secured to the perimeter of the wheel 34, and which as the position of the sleeve 15 is shifted longitudinally of the shaft 3 in response to variations in speed of the apparatus, are adapted successively to have engagement with the annular ridge 16 (Fig. 1) upon the speed controlled sleeve 15. The friction wheel 34 is held against the sleeve 15 by a coiled spring 33ᵃ (Figs. 4 and 5) extending between a rocking arm 33ᵇ on the shaft 33 and the base plate 2 of the apparatus. To hold each semaphore disk in position opposite the semaphore casing opening 27 each of the friction strips 35 has mounted within the circumference (Figs. 1, 4 and 5) stop lugs 36, said lugs being successively spaced around the circumference of the friction wheel 34, at intervals of 120 degrees and adapted to contact with the annular ridge 16 of the sleeve 15 to hold the friction wheel 34 against further rotation so long as one of them is in contact with the ridge 16 of the sleeve 15. Hence, as the sleeve 16 in moving longitudinally of the shaft 3, in response to variations in speed of the apparatus, is shifted from one to the other of the friction strips 35, of the friction wheel 34, a different transparent colored semaphore segment will be positioned behind the opening 27 in the semaphore casing, whereby the speed of the vehicle at any given time may be readily ascertained by a bystander by observing the color of the semaphore segment exposed.

It is desirable in apparatus of the character herein described to procure a permanent and continuous record of both the speed and the distance traveled by the vehicle upon which the apparatus is used, and to this end I have provided a continuous record strip 37 of paper or other suitable material (Figs. 1 and 7), which is fed from a supply roll 38, beneath a spring tension bar 39, and over a platen roll 40, beneath a guide roll 41, and on to a receiving and actuating roll 42, all of which are mounted in suitable bearings within the main frame. The receiving and actuating roll 42 is held in frictional engagement with an actuating ratchet wheel 43 rotatably mounted upon the shaft 44 of the said roll by means of a spring 45 (Fig. 1) coiled around the shaft 44 between the ratchet wheel 43 and the machine frame. To actuate the ratchet 43, a pawl 46 (Fig. 7) is provided, pivotally mounted upon a stud 47 (Fig. 6) rising through a guide 48 on the main frame from a cam block 49, which straddles an operating cam 50, secured to a transverse shaft 51, journaled in the machine frame. The cam block 49 is held in contact with the cam 50 by means of a suitable spring 52, interposed between the guide 48 and the top of said block. The ratchet wheel 43 is held against reverse movement by a suitable pawl 43ᵃ (Fig. 7) pivoted above the ratchet 43 at 43ᵇ to the machine frame. The transverse cam shaft 51 is provided with a suitable actuating gear 52' (Fig. 7) which is actuated from a worm 53, upon the main shaft 3. The platen roll 40 is provided with an actuating gear 54 (Figs. 1 and 7), which is actuated from a worm 55 also upon the transverse shaft 51.

Figure 10:
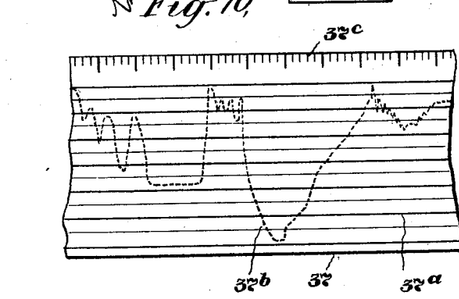
Fig. 10 is a fragmentary view of the permanent speed and distance record produced by the machine.

To provide for uniform feed of the strip 37 over the platen roll 40 by the actuating roll 42, notwithstanding the increase of diameter of said roll 42 as the strip winds upon it, the roll 42 when the strip begins to wind upon it partakes of the full movement of its actuating ratchet wheel 43. As the diameter of the receiving roll builds up, however, whereby the strip would be more rapidly wound up, if the speed of the roll 42 remained constant, the friction connection between the ratchet wheel 43 and the roll 42 permits the former to slip upon the latter, but affords sufficient friction to cause the roll to maintain the strip taut at all times over the platen 40. To afford a record of the speed of the vehicle at different intervals of time, the recording strip 37 is provided with longitudinally ruled lines 37ᵃ, over which travels a stylus 56 (Figs. 1 and 7) mounted in the rocking arm 57, secured to the rock shaft 58 (Fig. 1), which in turn is journaled in suitable bearings in the machine frame 1, and extends longitudinally thereof parallel with the rock shafts 13, carrying the bell sounders 12. Upon the end of the stylus rocking shaft 58 (Fig. 1) opposite the stylus is secured an actuating arm 59, having a forked end 60, which engages an eccentric upon the main shaft 3, which eccentric may, if preferred, be a part of the adjustable speed controlled sleeve 15. The purpose of rocking the stylus 56 is to cause it to emboss a series of indentations upon the record strip 37, to produce a continuous record thereon. The stylus is moved transversely of the strip by a longitudinal movement of the shaft 58, which is communicated thereto by the speed responsive movements of the sleeve 15, through the rocking arm 59. The spaces between successive ruled lines upon the strip 37 may be determined by any arbitrary scale of measurement, as, for example, each space may represent a difference in speed of five miles per hour; so that as the line of recording indentations or embossed points 37$^b$, departs from the left hand edge of the record strip, as shown in Fig. 1, a greater speed per hour will be indicated. While I have described the stylus 56 as embossing a series of indentations, I have in Fig. 10 represented a line 37$^b$, since in practice the embossed points may be so close together as to appear as a line. Intervals of time also may be recorded upon the strip 37, whereby it will be possible to readily determine the speed of the vehicle at any given time of its travel. To this end a time indicating wheel or roller 61 (Figs. 1 and 7) is mounted to roll in contact with the margin of the record strip 37, over the platen 40, said wheel having teeth 61$^a$, upon its perimeter spaced apart for intervals of say one hour, whereby an embossed record 37$^c$ of time intervals, may be impressed upon the margin of the strip opposite the record line 37$^b$ of speed indentations, produced by the stylus 56. The time indicating wheel may be mounted in any convenient manner, as upon the rocking arm 62 (Fig. 1) pivoted upon a stud or short shaft 63 and held in firm contact with the record strip 37, by means of a spring 64 coiled about the shaft 3, and secured thereto by a pressure adjusting collar 65.

Figure 11:
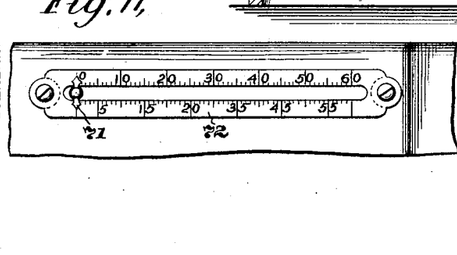
Fig. 11 is a detail view of a speed indicating scale and pointer for observation by the operator of the device to which the apparatus is attached.
Figure 12:
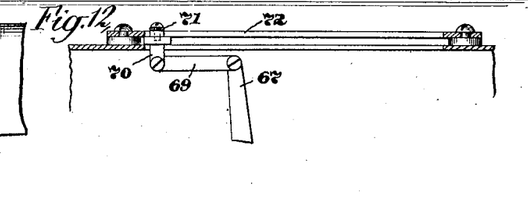
Fig. 12 is a sectional view taken through the pointer shown in Fig. 11.

In order that the speed of the vehicle or other apparatus to which the device is attached may be conveniently observed at any given time by the operator of the vehicle, the stylus arm 57 is connected by means of a pin 66, with a vertically mounted rocking arm 67 (Figs. 1 and 7), pivoted at 68 to the frame of the apparatus, and connected by a link 69 (Fig. 12) with a depending stud 70 of a sliding pointer 71, which is mounted to slide in contact with a suitable scale 72 (Figs. 11 and 12) secured to the top of the dustproof casing of the machine. As the stylus 56 moves transversely of the record strip 37, the visual pointer 71 will be given a corresponding and somewhat amplified movement over the scale 72, and the position of the pointer with respect to the graduations of the scale 72 will afford a convenient means for observing the speed of the vehicle at any given time.

Figure 2:
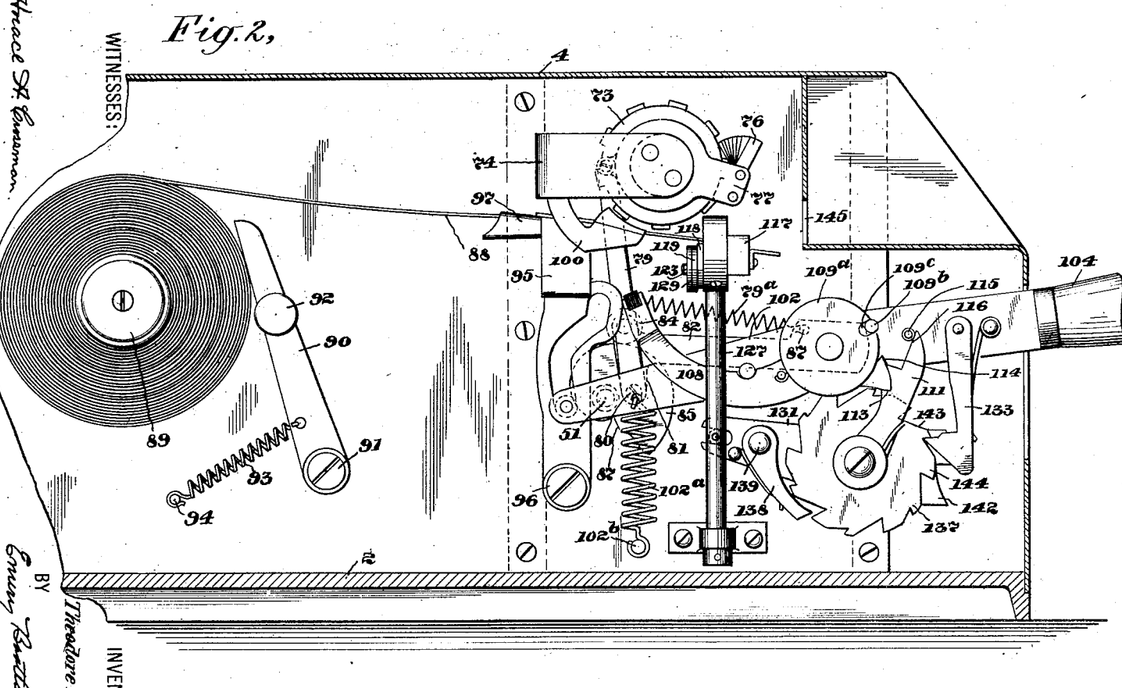
Fig. 2 is a vertical section on the line 2—2, Fig. 1.

In adidtion to the audible and visual speed indicating and recording mechanism hereinbefore described, I have provided in my apparatus means for producing and presenting a succession of distance records, whereby an accurate and reliable record may be kept of the distances traveled by the vehicle, so that the owner thereof may have ready means for keeping a permanent and convenient record of the distances traveled by the vehicle at various times and may also be able to detect unwarranted use of the vehicle, by comparing a record produced by this mechanism, which he may keep in his possession, with the next successive record which he may at any time obtain from the apparatus. To this end I have provided apparatus for the manual printing and removal of numbers indicating the distance traveled by the vehicle during any interval of time. This mechanism comprises a numbering device 73, which is mounted upon a suitable support 74, secured to the side of the machine frame (Figs. 1, 2, 7, and 8), and which may be of any ordinary and well-known construction, and comprises a plurality of numbering disks or wheels 75, adapted to be operated by a series of pawls 76, which are mounted upon a yoke 77, which rocks upon the stud 78 carrying the numbering disks 75. To actuate the pawls 76 the yoke 77 has pivoted thereto diametrically opposite said pawls a depending link 79 which is pivoted at its opposite end at 80 to an arm 81 of a cam lever 82 (Fig. 2), which in turn is pivoted upon a stud 83 (Fig. 1) projecting from the side of the machine frame and having at its opposite extremity a cam roll 84 which rides upon a spiral cam 85 secured to the outer extremity of the transverse shaft 51, which projects through the side of the machine frame into the chamber occupied by the mechanism now being described. The roll 84 is held against the cam 85 by means of a spring 79$^a$ (Fig. 2) which extends between the arm 79 and a stud 87 on the cam lever 82. As the cam 85 rotates, the cam roll 84 will ride up thereupon and shift the pawl carrying the yoke 77 for a new engagement with the proper number-wheel or disk 75. As the shoulder 87' of the cam 85 is presented to the cam roll 84, the latter, together with the link 79 will drop under the influence of the spring 79$^a$ and thus actuate the number-wheel pawls 76 to bring the proper number into position for the printing of the record. This record may be printed in any convenient manner, but as here shown is received upon a strip of paper 88 (Figs. 1, 2, 7 and 8) carried by a roll 89 secured to the side of the machine frame. To afford convenient means for ascertaining the condition of supply of the strip upon the roll 89, I provide a spring rocking arm 90, pivoted at 91 to the frame of the machine, and having a suitable indicating disk 92, which arm is spring-held against the perimeter of the paper roll by means of a spring 93 extending between said arm and the stud 94 upon the machine frame, so that as the supply of paper upon the roll 89 becomes exhausted, the indicator disk 92 will be moved opposite an aperture 95 (Fig. 1) in the side of the dustproof casing of the machine, which is arranged at a point convenient for operation by an operator of the vehicle.

To print the desired record upon the strip 88, said strip is fed beneath the numbering apparatus 73, by means of a vertical rocking feed arm 95, pivoted at 96, to the side of the machine frame and having at its upper extremity a guide 97 to receive and guide the strip 88 beneath the numbering wheel. Within the interior of the guide 97 (Fig. 8), is pivoted at 98 a spring clamping dog 99, which is normally actuated by a suitable spring to clamp the strip 88 between itself and the upper inner wall of the guide 97 in such manner that while the strip will be firmly gripped between the dog and wall during the forward movement of the guide, the dog 99 will release the strip when the guide is moved to the rear, thus leaving the leading extremity of the strip in position beneath the numbering wheels 75 to receive the printed record. A supplemental guide 100 (Fig. 8) stationarily secured to the numbering device supporting bracket 74, is provided to accurately guide and hold the strip 88 in printing position during the feeding reciprocations of the feed guide 97 and a pair of spring arms 101 secured to the rocking arm 95, serves to support the strip 88 closely against the under surface of the guide 100 and in convenient printing position. To actuate the feed lever at 95 I provide a hand lever 102 pivoted upon the stud 83 and projecting through an aperture 103 in the dustproof casing of the machine, and provided at its outer extremity with a suitable handle 104 which is held in elevated position by a spring 102$^a$ extending from the inner end of said lever to a stud 102$^b$ on the machine frame. Upon the inner end of the hand lever 102 is mounted a cam roll 105 which operates in a cam slot 106 in the feed actuating lever 95; so that as the handle 104 of the hand lever 102 is depressed, the feed lever and consequently the feed clamp 97 is moved to the rear to secure a new grip upon the record strip 88, to feed the required portion of the strip forward beneath the printing mechanism.

To print the record from the numbering wheels 75, I employ a platen 107 (Figs. 2 and 8) secured upon the rear end of a lever 108, which is mounted upon the stud 83, and is normally under tension of a spring 109, which is coiled about the stud 83 and having one end secured to a rotary tension disk 109$^a$ which is rotated to tension the spring at each depression of the manual lever 102 by a stud 109$^b$ extending from said lever and engaging a notch 109$^c$ on said disk, and tends to elevate the lever and throw the platen against the numbering wheels 75. In the normal position of the hand lever 102, the platen lever 108 is held against such upward movement by means of a pin 110 upon the hand lever 102, which extends over the lever 108; and said platen lever is further held from upward movement by means of a spring pawl 111, pivoted upon a stud 112 projecting from the machine frame, and having a pawl tooth 113 which engages beneath the tail 114 of the platen lever 108. To release the platen lever the hand lever 102 is provided with a pin 115, which engages an upward extension 116 of the pawl 111, so that upon depression of the hand lever 102 the pawl 111 will be moved by the pin 115 from beneath the tail 114 of the platen lever 108, whereby the latter will be permitted to spring upwardly under the influence of the spring 109 to drive the record strip 88 against the numbering wheels 75 to print the required record. Upon return of the handle lever 102 the normal position of the platen lever 108 will be again depressed by engagement of the pin 110 projecting thereover from the hand lever 102 until the spring pawl 111 is again permitted to engage beneath the tail 114 of the platen lever 108.

In order that successive separate records may be obtained from the record strip 88, I provide, in conjunction with the feeding and printing mechanism, suitable strip severing mechanism, which is here shown as carried by a supporting bar 117, mounted upon the machine frame. The strip shearing or cutting mechanism proper is illustrated in Figs. 8 and 13 to 17, inclusive, and consists of the upper and lower shearing and cutting knives 118 and 119, which are mounted respectively upon pins 120 and 121 projecting from rotatable bushings 122, secured by screws 123 to the supporting bar 117.

As will be seen from an inspection of Fig. 14, the pins 120 and 121 are secured upon opposite sides of the centers of the bushings 122 and the pins 121 project through arc-shaped slots 124 in the body of the upper cutting blade 118, so that upon rotation of the bushings 122, the upper and lower cutters are simultaneously depressed and elevated respectively for the shearing stroke. To rotate the bushings 122, one of them is connected by means of a rocking arm 125 (Figs. 13 and 15), secured to said bushing by a set screw 126, to a vertical reciprocating rod or plunger 127 (Fig. 8) mounted to reciprocate in a guide 128 on the side of the machine frame. To prevent the cutting blades from springing apart in the cutting stroke, I provide along the front face of the lower cutting blade 119, a spring strip 129 (Figs. 13, 15, 16 and 17), which in its normal shape is bowed inwardly, so that when secured in position against the lower cutting blade by means of the screw 123, the spring action thereof presses the edge of the lower cutting blade toward that of the upper cutting blade; this maintains the blades in close effective shearing position. To actuate the cutters described, the vertically actuated spindle 127 is provided with a laterally projecting stud 130 (Figs. 2 and 8), which is engaged by the inner end of a cutter actuating lever 131, pivoted upon the stud 112 (Fig. 8). Said lever is normally pressed upwardly by means of a spring 132 (Fig. 7) coiled about the stud 112, thereby normally holding the spindle 127 in elevated position, and thus maintaining the cutting blades separated from each other.

To actuate the cutter actuating lever 131 the hand lever 102 is provided with a depending spring pawl 133 (Figs. 2, 7 and 8) having at its lower end a pair of pawl teeth 134 and 135. The pawl tooth 134 is adapted to engage the ratchet teeth 136 of a ratchet disk 137 loosely mounted upon the stud 112, said disk being prevented from reverse movement by a spring pawl 138 pivoted at 139 upon the inner end of the cutter actuating lever 131. The pawl tooth 135 of the spring pawl 133, on the other hand, is adapted to engage beneath a tooth 140 upon the rear extremity of the cutter actuating lever 131, and has a cam face 141, which is adapted to engage a corresponding cam face 142 also upon the rear end of the lever 131 and extending downward from the tooth 140. The alternate teeth of the ratchet 137 are of different shape, as shown clearly in Figs. 2 and 8, the teeth 143 being so shallow that the pawl tooth 134 of the pawl 133 when lying in the notch 143ᵃ (Fig. 8) maintains the pawl tooth 135 entirely out of engagement with the tooth 140 upon the rear of the cutter actuating lever 131. When, however, the deeper ratchet tooth 144 passes beneath the pawl tooth 134, the latter is forced inward to a sufficient extent to permit the pawl tooth 135 to pass beneath the cutter actuating lever tooth 140, so that when the pawl rises with the hand lever 102, the inner end of the cutter actuating lever 131 will be depressed, and thus depress the reciprocating spindle 127, and through the connecting rocking arm 125 rotate the cutter actuating bushing 122 connected therewith, and thus actuate the cutters 118 and 119 for the cutting stroke. Upon the next depression of the cutter lever actuating pawl 133, the latter will again ride over one of the shallow teeth, and will consequently, upon its return to upward position, merely rotate the ratchet disk 136 without at the same time actuating the cutter actuating lever 131. The purpose of this mode of operation will be apparent from the following description of the operation of the printing, feeding and severing of the record strip 88.

When it is desired to secure a record of the distance traveled by the vehicle or other mechanism to which my apparatus is attached, the handle 102 is depressed, and thereupon the strip-feeding lever 95 is moved to the rear for a new grip upon the record strip 88, by means of the cam roll 105 operating in the cam slot 106 of said lever. At the same time the platen lever 108 is released from its retaining pawl 111 by the pin 115 upon the hand lever 102, whereby the platen is thrown by its spring 109 against the under side of the record strip 88, and opposite the particular number which has been moved to printing position, whereby said number is impressed upon said record strip. Upon return of the hand lever 102 to normal position, the feed lever 95 is returned by means of cam roll 105 and cam slot 106 to forward position, thereby feeding a predetermined portion of the record strip 88 beneath the numbering wheels 75. During the operation of the feeding and printing mechanism just described, the cutter actuating pawl 133 has ridden idly over one of the shallow teeth 143 of the ratchet disk 136, and upon return of the pawl 133 to its initial position, has merely served to rotate the ratchet wheel 136 to bring the next succeeding and deeper tooth into operative position. Upon the next depression of the hand lever 102, the movements of the feed lever 95 and the platen 107 take place as before, whereby a second impression is made upon the record strip 88, and if between the two recording operations there has occurred any travel of the vehicle or other mechanism, the numbering wheels 75 will have been correspondingly adjusted to bring a new number indicating the total distance thus far traveled into printing position. Upon return of the hand lever 102 to normal position after this second operation, and after the feed of the strip 88 has been effected by the feed lever 95, the pawl tooth 135 of the cutter actuating pawl 133 which now engages the tooth 140 upon the rear of the cutter actuating lever 131, serves to depress the inner end of said lever, and thereby actuate the cutting mechanism above described to sever that portion of the record strip 88 upon which the two successive impressions have been made from the body of the strip, said portion having been fed out through an aperture 145 (Fig. 2) in the dustproof case within reach of the operator.

Figure 9:
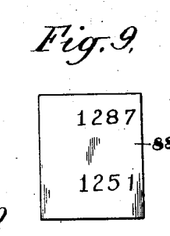
Fig. 9 is a view of one of the segregated distance records.

As the pawl tooth 135 of the cutter lever actuating pawl 133 raises the end of the lever 131, the cam face 131 of said pawl 135 rides upon the cam face 142 upon said cutter actuating lever beneath the tooth 140, and gradually forces the tooth 135 from beneath the tooth 140 until, as the pawl is about to regain its normal upward position, it is entirely disengaged from the cutter actuating lever 131, which is then returned to normal position by means of its spring 132; and thus through the intervention of the vertical spindle 127 and the rocking arm 125 connected therewith, returns the cutters to their normal open position. By the mechanism just described the owner of the vehicle or other authorized person, is enabled by comparing the successive numbers printed upon the segregated slip which he has received from the apparatus, to determine the total distance which the machine has thus far traveled, and also the distance traveled between successive imprints on the strip 88. Thus, in Fig. 9 is shown an example of the separate record slip produced by this mechanism, the number 1251 representing the total distance traveled by the vehicle up to the time said record was taken, and the number 1287 the total distance traveled up to the time the next successive record was taken and the difference between these numbers 36 includes the distance traveled in the interval between the taking of these records. Furthermore, the record slip (Fig. 9) may be removed from the apparatus and preserved for future reference, and for comparison with the next succeeding record taken from the apparatus. Upon such comparison any difference between the last number on the first slip with the first number appearing upon the next succeeding slip, will indicate the fact and extent of use of the vehicle during the interval between the taking of said records. This mechanism, therefore, provides an easy and reliable means for detecting unauthorized use of the vehicle or apparatus with which it is employed and for ascertaining precisely to what extent the apparatus has been operated or used.

While I have herein described one particular form of apparatus illustrating my invention, it is to be understood that the invention is not to be confined to the embodiment herein shown, but may be variously embodied without departing from the spirit and scope of the invention.

Claims.

1. An apparatus of the class described comprising in combination a vehicle body; a main shaft rotatably connected with the running gear of the vehicle; a distance register operated by said shaft; manually operative means for feeding a record strip to said device for printing from said register two successive cumulative distance records indicating distances traveled at two successive times; and means for severing a portion of said strip bearing said two successive cumulative record imprints.

2. In apparatus of the class described the combination with a vehicle body, a main shaft rotatably connected with the running gear of the vehicle, of distance registering means, manually operable means for feeding a record strip step by step thereto, means for recording progressive distance totals traveled at different periods by the machine to which the mechanism is attached, and means for severing two successively recorded totals from said strip and presenting the severed portion in convenient position for removal from the apparatus.

3. In apparatus of the class described, a vehicle body, a main shaft rotatably connected with the running gear of the vehicle, means for producing progressive total distance records comprising distance registering means, means for feeding a record strip thereto, means for operating said distance registering means so as to indicate upon the strip successive records whose difference indicate the total distance traveled by the vehicle between successive operations of said registering means, and means for severing a portion of said strip, bearing said successive records.

4. In apparatus of the class described the combination with an operating shaft and a distance registering device operated thereby, of means for feeding a record strip to said device, means for printing from said device after each feeding step, means for severing the printed portion of said strip after alternate printing operations and an operating lever by which said apparatus is caused to print and feed at each operation of said lever, and to effect said severing operation upon alternate operations of said lever.

5. In apparatus of the class described the combination with a vehicle body, a main shaft rotatably connected with the running gear of the vehicle, distance registering means, means operating upon the first actuation of said apparatus to produce a record of the distance registered thereby, and operating upon the next actuation of said apparatus to produce a second distance record, means also operating upon said second actuation to sever two successive records from a record strip and to present the same conveniently for removal from the mechanism.

6. The combination with distance recording means of record separating or detaching means coöperating therewith, a hand lever for operating said means, operating connections between the said separating or detaching means and lever whereby the former may be actuated only upon alternate strokes of said lever.

7. The combination with distance recording mechanism of an operating handle therefor, connections between said mechanism and handle whereby on two successive strokes of the latter, two successive distance records may be produced upon a record strip, and whereby upon alternate strokes of said handle said pair of records may be separated or detached and presented for removal.

8. In apparatus of the class described the combination with a main actuating shaft, of a speed controlled member adapted to move in response to variations in the speed of said shaft, visual indicating mechanism and audible speed indicating mechanism having means to indicate different speeds and speed recording mechanism actuated by the movement of said member.

9. In apparatus of the class described the combination with a vehicle body, a main shaft rotatably connected with the running gear of the vehicle, an actuating shaft, a speed recording mechanism operatively connected therewith and a plurality of audible but differentiated speed indicating members indicative of different speeds, sounders for said members, actuating arms for said sounders and a speed responsive member movable longitudinally of said shaft and having a cam surface to successively shift said actuating arms for successive actuation of said sounders thereby to act upon that speed indicating member corresponding to the existing speed.

10. In apparatus of the class described, the combination with a vehicle body, a main shaft rotatably connected with the running gear of the vehicle, means for producing upon the strip a series of successive distance records, said means being operatively connected with the main shaft of the vehicle, means for severing said strip, thereby to produce separate records, and means to present said strips for removal from the apparatus.

11. In apparatus of the class described the combination with visual speed indicating mechanism and audible speed indicating mechanism having means to indicate different speeds, and speed recording mechanism of a common speed controlled actuator for said mechanism.

12. In apparatus of the class described, the combination with a vehicle body, a main shaft rotatably connected with the running gear of the vehicle, means to support a record strip, a platen roll therefor, a receiving roll for the strip, means to drive said roll positively from said main shaft, and means permitting slip of the said roll as the diameter of said roll increases with the increased amount of the record strip received thereon.

13. In apparatus of the class described, the combination with means to support a record strip and a platen roll therefor, a speed controlled stylus adapted to vibrate against said strip to produce a speed record thereon, a longitudinally movable shaft whereon said stylus is mounted, and means to impart longitudinal movement to said shaft.

14. In apparatus of the class described, the combination with means to support a record strip, and a platen roll therefor, a speed controlled stylus adapted to vibrate against said strip to produce a speed record thereon, a rock shaft whereon said stylus is mounted, means to rock said shaft, and means to impart lengthwise movement to the rock shaft to move the stylus transversely of the strip.

15. In apparatus of the class described, a visual speed indicator and actuating means therefor comprising a friction wheel having stops to determine the position of said indicator, a movable speed responsive member to actuate said wheel and a speed recording mechanism controlled by said movable speed responsive member.

16. In apparatus of the class described, the combination with audible and visual speed indicating mechanisms, a speed controlled member having a cam and friction member for actuating said mechanisms, and a speed recording mechanism controlled by said speed controlled member.

17. In apparatus of the class described, the combination with a visual speed indicator of an actuating wheel therefor, having a plurality of angularly arranged stops, a speed controlled member adapted to rotate said wheel and to coöperate with said stops to position said indicator and a speed recording mechanism controlled by said speed controlled member.

18. In apparatus of the class described, the combination of a visual speed indicator of an actuating wheel therefor having a plurality of angularly arranged stops located in different circumferential lines, a speed controlled member adapted to rotate said wheel and movable axially thereof to coöperate with said stops to position the indicator, and a speed recording mechanism controlled by said speed controlled member.

19. In apparatus of the class described, the combination with a visual speed indicator of an actuating member therefor having a plurality of positioning stops, a speed controlled driver for said actuating member adapted to coöperate with said stops to position the indicator and a speed recording mechanism controlled by the speed controlled driver.

20. In apparatus of the class described, the combination with an audible speed indicator comprising a plurality of bells and hammers therefor, a movable speed controlled member having a cam to successively actuate said hammers to sound said bells and a speed recording mechanism controlled by said movable speed controlled member.

21. In apparatus of the class described, the combination with a speed indicating mechanism of a speed controlled actuator therefor comprising a plurality of centrifugal governors connected in series, and a speed recording mechanism controlled by said speed controlled actuator.

22. In apparatus of the class described, the combination with speed indicating mechanism, of a speed controlled actuator therefor comprising a plurality of centrifugal governors connected in series, and indicator actuating mechanism adapted to be shifted by said governors, and a speed recording mechanism controlled by said speed controlled actuator.

23. In apparatus of the class described, the combination with means to support a record strip, of a platen roll therefor, a speed controlled stylus adapted to vibrate against said strip to produce a speed record thereon, a rock shaft whereon said stylus is mounted, means to rock said shaft, a receiving roll for the strip, means to drive said receiving roll positively, and means permitting slip of said roll as the diameter of the roll increases with the increased amount of the record strip received thereon.

24. In apparatus of the class described, the combination with a speed controlled member of a speed recording mechanism actuated thereby and including a speed controlled stylus, means to support a record strip movable past the stylus, and a visual and audible speed indicating mechanism actuated by said speed controlled member, the said audible speed indicating mechanism having means to indicate a plurality of speeds.

25. In a speedometer, a recording member, means for moving said member and means for controlling the movements thereof, said means comprising a rotatable shaft, a pair of governing devices operating centrifugally in connection with said shaft, a spring for resisting the centrifugal action of one of said governing devices, a weaker spring for resisting the action of the other governing device, and means connecting said governing devices with the recording member, the construction being such that one of said governing devices moves the said recording member a definite distance before the other governing device begins its operation upon said member.

26. In a speedometer, a drive shaft, and record receiving member, gearing connecting said drive shaft and member whereby the latter is moved, a recording member adapted to move over said receiving member and to produce a record thereon, a governor shaft, a pair of governor weights carried by said governor shaft, said weights being adapted to move outwardly from said shaft as the latter rotates, a spring for resisting the movement of one of said governor weights, a weaker spring for resisting the movement of the other governor weight, a sliding member mounted on the said shaft and connected with said governor weights so as to be moved thereby, and means connecting said member with the said recording member.

27. In an apparatus of the character described, a movable indicating member and means for controlling the movement thereof comprising a rotatable shaft, a pair of governing devices operating centrifugally in connection with said shaft, a spring for resisting the centrifugal action of one of said governing devices, a weaker spring for resisting the action of the other governing device, and means connecting said governing devices with the recording member, the construction being such that one of said governing devices moves the said recording member a definite distance before the other governing device begins its operation upon said member.

28. In an apparatus of the class described, a plurality of movable indicating members and means for controlling the movements thereof, said means comprising a rotatable shaft, a pair of governing devices operating centrifugally in connection with said shaft, a spring for resisting the centrifugal action of one of said governing devices, a weaker spring for resisting the action of the other governing device, and means connecting said governing devices with the recording member, the construction being such that one of said governing devices moves the said recording member a definite distance before the other governing device begins its operation upon said member.

29. In an apparatus of the character described, a speed indicating mechanism and a speed recording mechanism and means for controlling the movements thereof, said means comprising a rotatable shaft, a pair of governing devices operating centrifugally in connection with said shaft, a spring for resisting the centrifugal action of one of said governing devices, a weaker spring for resisting the action of the other governing device, and means connecting said governing devices with the recording member, the construction being such that one of said governing devices moves the said recording member a definite distance before the other governing device begins its operation upon said member.

30. In an apparatus of the character described, a vibratory stylus, a record receiving member, means for vibrating said stylus, and means for controlling the vibrations thereof comprising a rotatable shaft, a pair of governing devices operating centrifugally in connection with said shaft, a spring for resisting the centrifugal action of one of said governing devices, a weaker spring for resisting the action of the other governing device, and means connecting said governing devices with the recording member, the construction being such that one of said governing devices moves the said recording member a definite distance before the other governing device begins its operation upon said member.

31. In an apparatus of the character described, a stylus, a record receiving member, means for moving said stylus and member relatively, and means for controlling the movement of the movable member comprising a rotatable shaft, a pair of governing devices operating centrifugally in connection with said shaft, a spring for resisting the centrifugal action of one of said governing devices, a weaker spring for resisting the action of the other governing device, and means connecting said governing devices with the recording member, the construction being such that one of said governing devices moves the said recording member a definite distance before the other governing device begins its operation upon said member.

32. In an apparatus of the character described, a stylus, a rocking member carrying the same, and means for controlling the rocking movement thereof comprising a rotatable shaft, a pair of governing devices operating centrifugally in connection with said shaft, a spring for resisting the centrifugal action of one of said governing devices, a weaker spring for resisting the action of the other governing device, and means connecting said governing devices with the recording member, the construction being such that one of said governing devices moves the said recording member a definite distance before the other governing device begins its operation upon said member.

33. In apparatus of the class described, the combination with a main shaft and a distance register operated by said shaft of manually operative means for feeding a record strip to said device, for printing successively from said register and for also severing a portion of said strip bearing two successive cumulative record imprints so that the strip bears two successive cumulative distance records indicating distances traveled at two consecutive times.

34. In apparatus of the class described, the combination with means to support a record strip, a platen roll therefor, a speed controlled stylus adapted to vibrate against said strip to produce a speed record thereon, a rock shaft whereon the stylus is mounted, means to rock said shaft, and a speed indicating mechanism movable with said stylus.

In testimony whereof, I have signed my name to this specification, in the presence of two subscribing witnesses.

THEODORE M. FOOTE.

Witnesses:
ANNIE E. CHESLEY,
RALPH C. POWELL.